United States Patent
Paik et al.

(10) Patent No.: US 7,043,064 B2
(45) Date of Patent: May 9, 2006

(54) METHOD FOR CHARACTERIZING SHAPES IN MEDICAL IMAGES

(75) Inventors: David S. Paik, Palo Alto, CA (US); Sandy A. Napel, Menlo Park, CA (US); Geoffrey D. Rubin, Woodside, CA (US); Christopher F. Beaulieu, Los Altos, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 764 days.

(21) Appl. No.: 10/138,113

(22) Filed: May 3, 2002

(65) Prior Publication Data

US 2002/0164060 A1   Nov. 7, 2002

Related U.S. Application Data

(60) Provisional application No. 60/288,674, filed on May 4, 2001, provisional application No. 60/288,621, filed on May 4, 2001.

(51) Int. Cl.
*G06K 9/00* (2006.01)

(52) U.S. Cl. .......................... 382/128; 128/922; 378/4; 378/21

(58) Field of Classification Search ............... 382/100, 382/128, 131, 132, 190, 195; 378/4, 21–37; 128/922

See application file for complete search history.

(56) References Cited

U.S. PATENT DOCUMENTS

| 4,907,156 | A | | 3/1990 | Doi et al. .............. 364/413.13 |
| 5,289,374 | A | | 2/1994 | Doi et al. .............. 364/413.13 |
| 5,398,685 | A | * | 3/1995 | Wilk et al. ................ 600/437 |
| 5,458,111 | A | | 10/1995 | Coin ........................... 128/747 |
| 5,657,362 | A | | 8/1997 | Giger et al. ................... 378/37 |
| 5,790,690 | A | | 8/1998 | Doi et al. .................... 382/128 |
| 5,920,319 | A | | 7/1999 | Vining et al. ................ 345/420 |
| 5,971,767 | A | | 10/1999 | Kaufman et al. ........... 434/267 |
| 5,987,094 | A | | 11/1999 | Clarke et al. ................. 378/62 |

(Continued)

OTHER PUBLICATIONS

C.F. Beaulieu et al., "Display Modes for CT Colonography. Part II. Blinded Comparison of Axial CT and Virtual Endoscopic and Panoramic Endoscopic Volume-Rendered Studies," Radiology, 212: 203-12, 1999.

(Continued)

*Primary Examiner*—Samir Ahmed
*Assistant Examiner*—Anand Bhatnagar
(74) *Attorney, Agent, or Firm*—Lumen Intellectual Property Services, Inc.

(57) ABSTRACT

A computer-implemented method for determining and characterizing, which portions or shapes of a medical image correspond to a shape of interest is provided. A candidate shape is obtained after which a visible surface is computed adjacent to this candidate shape. A visible surface includes one or more portions of the medical image that are visible by the candidate shape. Once the visible surface is determined, parameters of the visible surface are computed. Then the method further includes the step of determining whether the candidate shape corresponds to a shape of interest. The method further includes the step of computing features of the candidate shape and/or classifying the candidate shape. The advantage of the computer-implemented method is that it provides a high detection specificity, i.e. reducing false positives, without sacrificing sensitivity of the detection of a shape of interest.

24 Claims, 18 Drawing Sheets

U.S. PATENT DOCUMENTS

| | | | |
|---|---|---|---|
| 6,011,862 A | 1/2000 | Doi et al. | 382/132 |
| 6,083,162 A | 7/2000 | Vining | 600/407 |
| 6,088,473 A | 7/2000 | Xu et al. | 382/132 |
| 6,141,437 A | 10/2000 | Xu et al. | 382/130 |
| 6,212,420 B1* | 4/2001 | Wang et al. | 600/407 |
| 6,240,201 B1 | 5/2001 | Xu et al. | 382/130 |
| 6,263,092 B1* | 7/2001 | Roehrig et al. | 382/128 |
| 6,301,378 B1 | 10/2001 | Karssemeijer et al. | 382/132 |
| 6,331,116 B1 | 12/2001 | Kaufman et al. | 434/262 |
| 6,363,163 B1 | 3/2002 | Xu et al. | 382/130 |
| 2002/0006216 A1 | 1/2002 | Armato, III et al. | |
| 2002/0009215 A1 | 1/2002 | Armato, III et al. | |
| 2002/0028008 A1 | 3/2002 | Fan et al. | |
| 2002/0090121 A1* | 7/2002 | Schneider et al. | 382/128 |
| 2002/0097320 A1* | 7/2002 | Zalis | 348/65 |
| 2005/0107691 A1* | 5/2005 | Zalis | 600/425 |

OTHER PUBLICATIONS

D.S. Paik, et al., "Visualization Modes for CT Colonography Using Cylindrical and Planar Map Projections," Journal of Computer Assisted Tomography, 24: 179-88, 2000.

A.K. Hara et al., "Colorectal Polyp Detection with CT Colography: Two-Versus Three-Dimensional Techniques," Radiology, 200: 49-54, 1996.

* cited by examiner

METHOD FOR CHARACTERIZING SHAPES IN MEDICAL IMAGES

CROSS-REFERENCE TO RELATED APPLICATIONS

The present application is cross-referenced to and claims priority from U.S. Provisional Applications 60/288,674 filed May 4, 2001 and 60/288,621 filed May 4, 2001, which are both hereby incorporated by reference. This application is also cross-referenced to co-pending U.S. Patent Application entitled "Method for Detecting Shapes in Medical Images" filed with the USPTO on May 3, 2002, which is hereby incorporated by reference.

FIELD OF THE INVENTION

This invention relates generally to medical imaging. More particularly, the present invention relates to a method for characterizing shapes in medical images according to a shape of interest.

BACKGROUND

In the United States, lung cancer and colon cancer are the first and second leading cancer killers, respectively. Early detection of colonic polyps and lung nodules, the precursors to these diseases, has been shown to improve survival. Therefore, early detection of precancerous growths has become important so that they can be removed before evolving into a frank malignancy. In order to alert the radiologist to locations of possible nodules or polyps, a variety of methods have been proposed aimed at increasing the sensitivity or accuracy of detection (see, for instance, U.S. Pat. No. 4.907,156 to Doi et al.; U.S. Pat. No. 5,458,111 to Johnson et al.; U.S. Pat. Nos. 5,920,319 and 6,083,162 to Vining et al.; U.S. Pat. Nos. 5,971,767 and 6,331,116 to Kaufman et al., U.S. Pat. Nos. 6,088,473 and 6,141,437 to Xu et al. or U.S. Pat. No. 6,301,378 to Karssemeijer et al.). However, one of the limitations of detection methods focusing on increased sensitivity or accuracy of detection is that they could easily lead to a high false positive rate due to structures in the colon or lung with convex surfaces, such as haustral folds or pulmonary blood vessels. In other words, the increased sensitivity reduces the number of false negatives, but the increased sensitivity tends to increase the number of false positive detections (See, for instance, U.S. Pat. No. 5,289,374 to Doi et al., U.S. Pat. No. 5,657,362 to Giger et al.; U.S. Pat. No. 5,987,094 to Clarke et al. or U.S. Pat. No. 6,240,201 to Xu et al.). Furthermore, a detection due to false positive structures is usually based on the shape of the structure, which is often adjacent to other anatomical structures, thus making segmentation or elimination of false positive shapes difficult. For instance, a colonic polyp is always attached to the colon wall and some lung nodules are adjacent to either the chest wall or pulmonary vessels. However, automatically determining which portions of the image correspond to the shape of interest and which correspond to adjacent but distinct anatomical structures is very difficult.

Accordingly, there is a need to develop new methods to characterize shapes in medical images to determine which portions of the medical image correspond to a shape of interest. In particular, such a method for characterization of shapes is needed to provide accurate and early detection of pre-cancerous or cancerous growths.

SUMMARY OF THE INVENTION

The present invention provides a computer-implemented method for determining and characterizing, which portions or shapes of a medical image correspond to a shape of interest.

The medical images of the present invention are digital or computerized images such as, for instance, but not limited to, a CT, an MRI, a digitized X-ray, or any other medical image application that could be converted or rendered to a digital image. The medical images could be a 2-D image or a 3-D volumetric image. A shape of interest is, for instance, but not limited to, a shape that contains pre-cancerous tissue or cancerous tissue. Examples of shapes of interest to a radiologist are, for instance, polyps (such as colonic polyps), nodules (such as liver and lung nodules), lesions, or the like. However, even though the present invention is described with respect to medical images, a person of average skill in the art will readily appreciate that the present invention could easily be applied in any type of application where it is necessary to characterize a shape and determine whether this shape corresponds to a shape of interest. The method of the present invention first obtains a candidate shape after which a visible surface is computed adjacent to this candidate shape. A visible surface includes one or more portions of the medical image that are visible by the candidate shape, where visibility could be determined by all voxels along a line segment being either below or above a certain threshold. Once the visible surface is determined, one or more parameters of the visible surface are computed. For instance, one or more parameters could represent axes of an ellipsoid that fit the visible surface based on, for instance, a principal component analysis. Then depending on the value(s) of the parameter(s), the method further includes the step of determining whether the candidate shape corresponds to a shape of interest. In particular, it is of interest to determine whether the candidate shape may be pre-malignant or malignant in order to provide accurate and early detection of pre-cancerous or cancerous growths. The method further includes the step of computing one or more features of the candidate shape and/or classifying the candidate shape.

In view of that which is stated above, it is the objective of the present invention to provide a computer-implemented method to characterize a shape in a medical image.

It is another objective of the present invention to provide a computer-implemented method to determine which portions of a medical image correspond to a shape of interest.

It is yet another objective of the present invention to provide a computer-implemented method to correctly detect shapes, such as, nodules, polyps, lesions, or the like, that are nearby normal anatomical structures.

It is still another objective of the present invention to provide a computer-implemented method to characterize shapes to provide accurate and early detection of pre-cancerous and cancerous growths.

The advantage of the present invention is that the computer-implemented method provides a high detection specificity, i.e. reducing false positives, without sacrificing sensitivity of the detection of a shape of interest. Another advantage is that the present invention provides computer-aided assistance of physicians in the interpretation of medical images, making the process considerably more efficient than current human viewing interpretation and enabling a cost-effective medical diagnosis to be widely deployed for screening purposes. Yet another advantage is that the present invention is deterministic and thus, does not require any training, is very fast, and easy to implement.

BRIEF DESCRIPTION OF THE FIGURES

The objectives and advantages of the present invention will be understood by reading the following detailed description in conjunction with the drawings, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The present invention provides a computer-implemented method for characterizing one or more shapes in a medical image to provide accurate and early detection of pre-cancerous or cancerous growths and more particularly to eliminate false positives from such a detection. The present invention enables a user, such as, but not limited to, a radiologist, to determine which portions of the medical image corresponds to a shape of interest and which portions of the medical image correspond to distinct anatomical features. The medical images of the present invention are digital or computerized images such as, for instance, but not limited to, a CT, an MRI, a digitized X-ray, or any other medical image application that could be converted or rendered to a digital image. The medical images could be a 2-D image or a 3-D volumetric image. A shape of interest is, for instance, but not limited to, a shape that contains pre-cancerous tissue or cancerous tissue. Examples of shapes of interest to a radiologist are, for instance, polyps (such as colonic polyps), nodules (such as liver and lung nodules) or lesions. However, even though the present invention is described with respect to medical images, a person of average skill in the art will readily appreciate that the present invention could easily be applied in any type of application where it is necessary to characterize a shape and determine whether this shape corresponds to a shape of interest.

Figure 1:
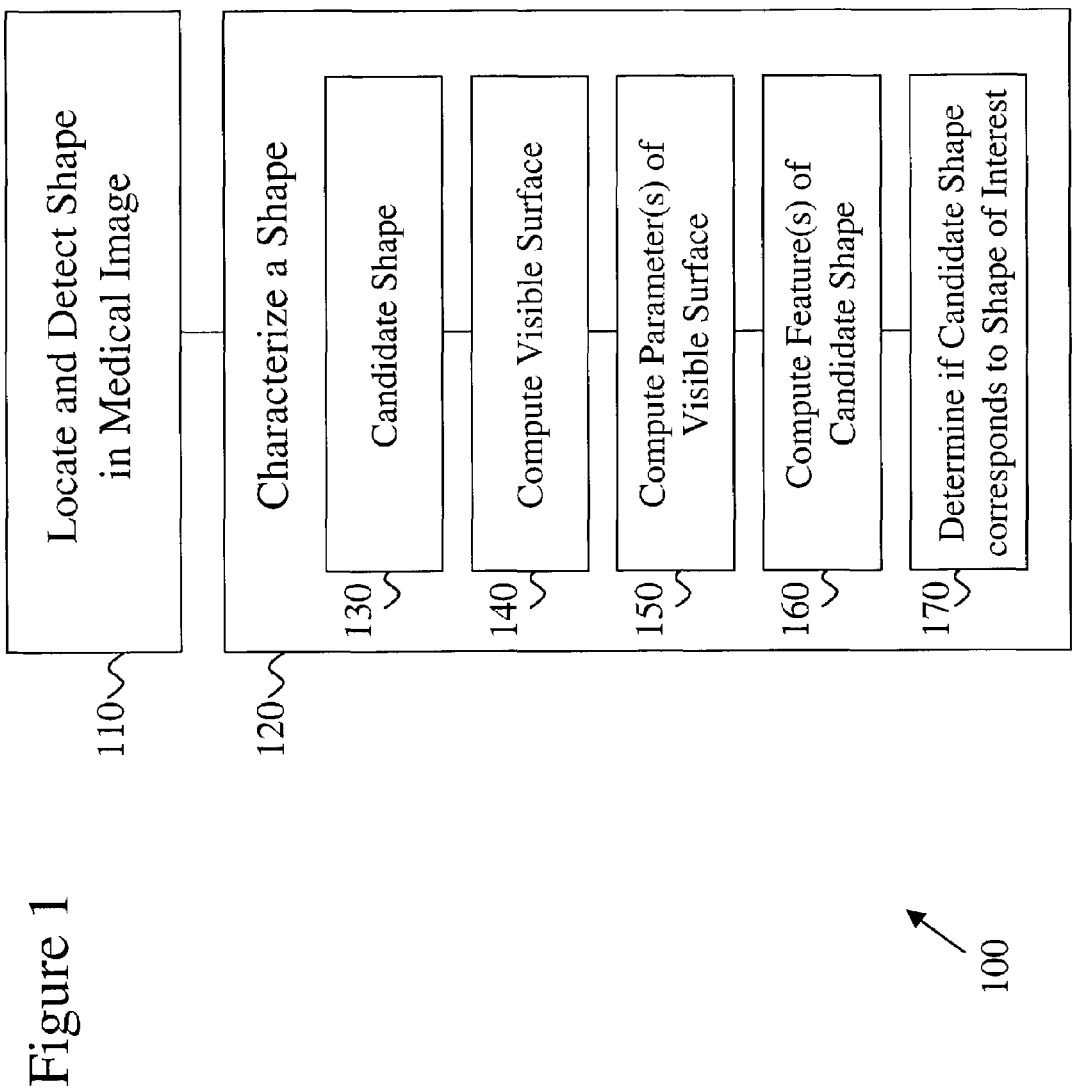
FIG. 1 shows an overview of the method of characterizing a shape in a medical image according to the present invention including the step of locating and detecting a shape in a medical image.

FIG. 1 shows method 100 according to the present invention. As a person of average skill in the art will readily appreciate, before one can actually characterize a shape 120 in a medical image, it would first be necessary to locate and detect 110 such a shape in the medical image. A user could perform the localization and detection 110 of a shape manually. For instance, a user could point at a shape or identify a shape using, for instance, but not limited to, a mouse or a touch-screen. However, as one of average skill would readily appreciate, such a manual selection would not be preferred since it would be time-consuming and fairly easy for a user to miss potential shapes that contain pre-malignant or malignant tissue. Therefore, an automatic method that locates and detects 110 shapes with high sensitivity would be preferred over a manual, time-consuming and less sensitive method. The present invention is in no way limited to the type of method for localization and detection 110 of a shape as long as it occurs with a high sensitivity. However, a preferred method for localization and detection 110 of a shape is described with reference to FIGS. 2–11 as well as in co-pending U.S. Patent Application entitled "Method for Detecting Shapes in Medical Images" filed with the U.S.P.T.O. on May 3, 2002. Again, the present invention is in no way limited to this particular preferred method step as described in this co-pending application and which is herein described for completion. Method step 110 includes a robust and highly sensitive computer-implemented method for automatic detection of shapes in a medical image. Method step 110 enables a user to focus in on a small percentage of an organ that most likely harbors clinically-significant pre-malignant or malignant tissue. Focusing in on a small percentage of an organ significantly reduces the time spent by a user on interpreting, reviewing or detecting shapes in a medical image and therewith reduces the cost on medical diagnostics.

Figure 2:
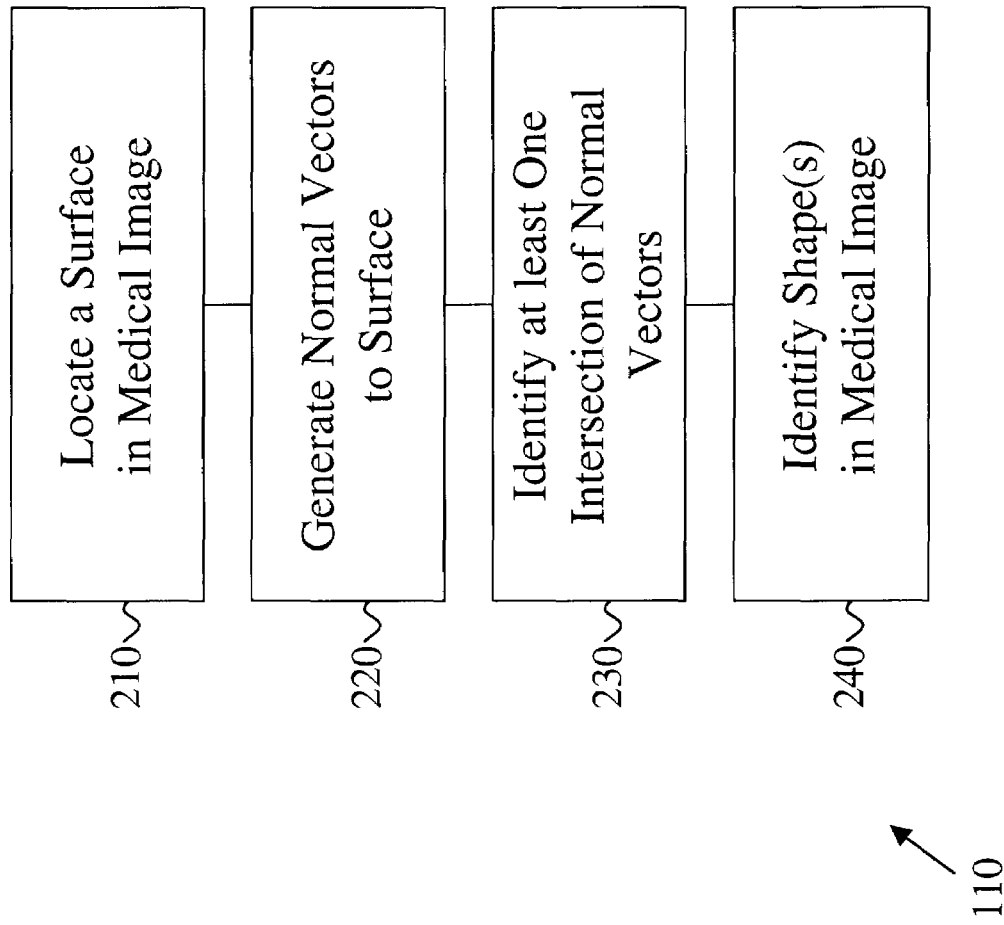
FIG. 2 shows a method of locating and detecting a shape in a medical image that could be used in the present invention.

FIG. 2 shows an example of method step 110 to locate and detect one or more shapes in a medical image. Method step 110 is based on the concept that normals to a surface, such as, but not limited to, a colonic surface or a lung, intersect or nearly intersect with neighboring normals depending on the curvature features of the colon or lung, respectively. Referring to FIG. 2, first a surface is located 210 in the medical image after which the normal vectors are generated 220 to the located surface. There are several different methods to identify a surface in a medical image and the selection of these methods is mostly dependent on the type of image or tissue. In general, the identification could involve a pre-processing and/or segmentation of the image. For instance, since the edges of both colonic polyps and lung nodules occur at an air-soft tissue interface, the soft tissue-bone interfaces may need to be removed by, for instance, but not limited to, clamping voxel intensities to be no greater than water intensity (0 HU). Then, the volume data could be made isotropic by tri-linear interpolation of the CT data to, for instance, but not limited to, 0.6 mm×0.6 mm×0.6 mm voxels. This step, although not strictly necessary, could be done in order to reduce any bias between lesions caused by differing orientations and also to reduce any bias between datasets caused by differing voxel sizes.

Another step in the identification of a surface could be segmentation. Segmentation is preferably performed automatically to identify, for instance, either the colon lumen or the lung parenchyma. A binary image, $S_1$, is created by thresholding all air intensity voxels (e.g. <−700 HU) followed by a negative masking of all air intensity voxels morphologically connected to any of the edges of the dataset, thus leaving only air density voxels within, for instance, the abdomen. In case of the colon, any portions of the lungs that are captured at the top of the dataset could also be removed by a negative mask of a 3D region filling seeded with air intensity regions in the most superior axial slice with a linear extent of greater than for example 60 mm. Finally, small air pockets (<15 cc in the colon datasets, <125 cc in the lung datasets) are determined to be extraneous and are negatively masked from the binary image. Next, a binary image, $S_2$, could be derived from $S_1$ and be used to limit the search space to voxels near the air-tissue interfaces in either the colon or the lung. This could serve two purposes; primarily, it reduces the computational overhead by approximately two orders of magnitude. It also reduces a few false positives arising from soft tissue structures outside the organ of interest. $S_2$ begins as the surface voxels of $S_1$ and then is morphologically dilated by for instance 5 mm to produce a thick region that contains the image edges of interest.

For shapes protruding into the colon, normal vectors intersect on the concave side of the shapes. For instance, polyps have 3-D shapes that change rapidly in any direction such that normals to the surface tend to intersect or nearly intersect in a concentrated 3-D area. By contrast, haustral folds change their shape rapidly when sampled across their short dimension, resulting in convergence of normals, but change shape very little when sampled longitudinally. This results in a relatively lower intensity of the convergence for haustrae as compared with a polyp of similar cross-sectional radius of curvature. In other words, at convexities, normals tend to intersect on a concave side of a polyp. Accordingly, method step 110 then identifies 230 at least one intersection of the normal vectors. The key idea is that the number of intersections identifies 240 one or more shapes, such as potential colonic polyp candidates or lung nodule candidates. Generating normal vectors could, for instance, be accomplished by using a gradient orientation calculation to detect high image gradient edges and determine the 3-D orientation of an image gradient. For instance, a Canny edge detector could be used or any other edge detector technique to determine the orientation of an image gradient.

Figure 3:
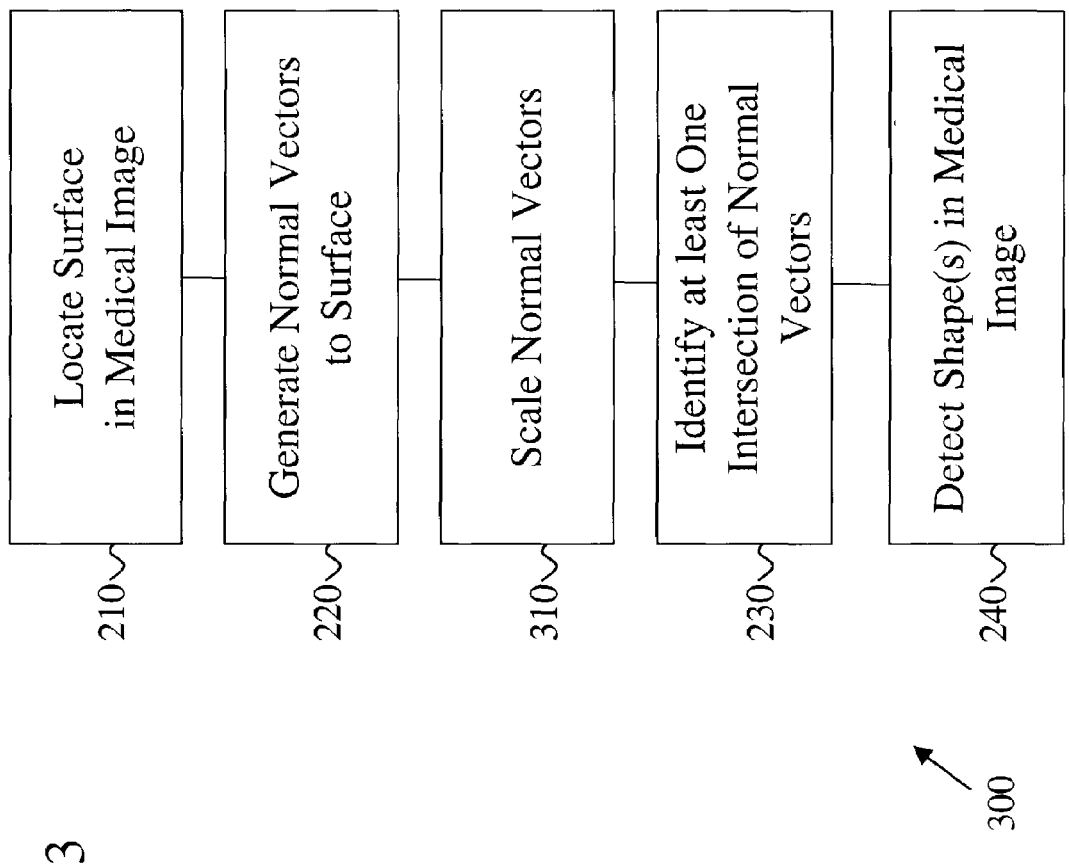
FIG. 3 shows a method of locating and detecting a shape in a medical image including the step of scaling normal vectors that could be used in the present invention.

FIG. 3 shows the identical methods steps as shown in FIG. 2 except for the addition of the step of scaling normal vectors 310. Scaling normal vectors 310 provides additional robustness to method step 110 as shown in FIG. 2 and includes scaling of the length and/or width (either in a 2-D or 3-D space) of the normal vectors. Such scaling is also referred to as the step of providing radial and transverse robustness, respectively. The contribution of each individual normal vector is then dependent on the distance from the surface edge element and the perpendicular distance from the normal vector. As one of average skill in the art will readily appreciate, scaling normal vectors 310 and the extent to how much scaling is appropriate, is dependent on the type of shapes a user wants to detect in a particular organ. To accomplish scaling of normal vectors 310, the input to the gradient orientation calculation could be modified. For instance, the input to the Canny edge detector could be modified.

Figure 4:
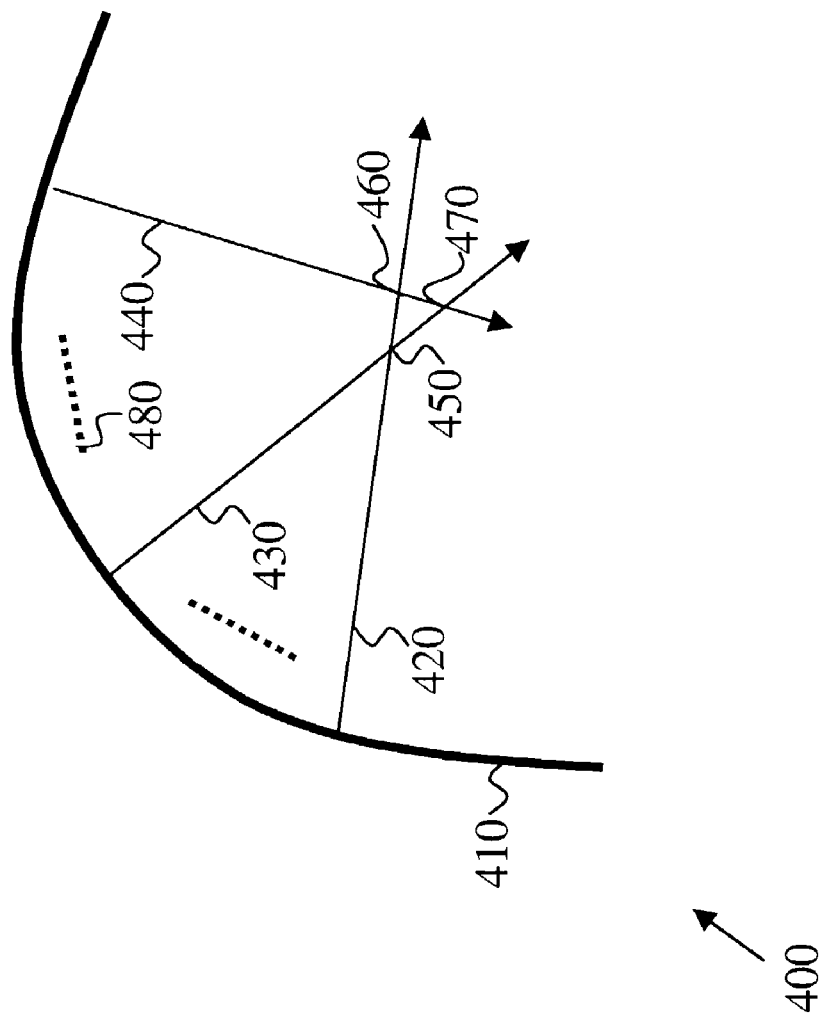
FIGS. 4–7 show several embodiments related to a 2-D representation of the methods shown in FIGS. 2–3.

FIGS. 4–7 show several embodiments related to a 2-D representation of method step 110. However, as a person of average skill in the art will readily appreciate, these examples are meant to be illustrative, and are in no way limiting to 2-D medical images or 2-D applications of the present invention since the present invention is preferably used in relation to 3-D medical images and detect 3-D shapes. FIG. 4 shows medical image 400 with a surface 410. In this example, three normal vectors 420, 430 and 440 are generated to surface 410. However, as indicated by the dotted lines, such as 480, the present invention is not limited to three normal vectors and could be a plurality of normal vectors. The choice and selection of the number of normal vectors that needs to be generated is dependent on the type of image as well as on the resolution of the image or voxels, and dimensions of the normal vectors generated in the image. As discussed above, the present invention focuses on identifying at least one intersection of normal vectors. FIG. 4 shows normal vectors 420 and 430 intersecting at point 450, normal vectors 420 and 440 intersecting at point 460, and normal vectors 430 and 440 intersecting at point 470. As also discussed above, the example of FIG. 4 generates intersections in a 2-D space with X and Y coordinates in the 2-D image. If image 400 were a 3-D image, the intersections would be in a 3-D space with X, Y and Z coordinates in the 3-D image.

Figure 5:
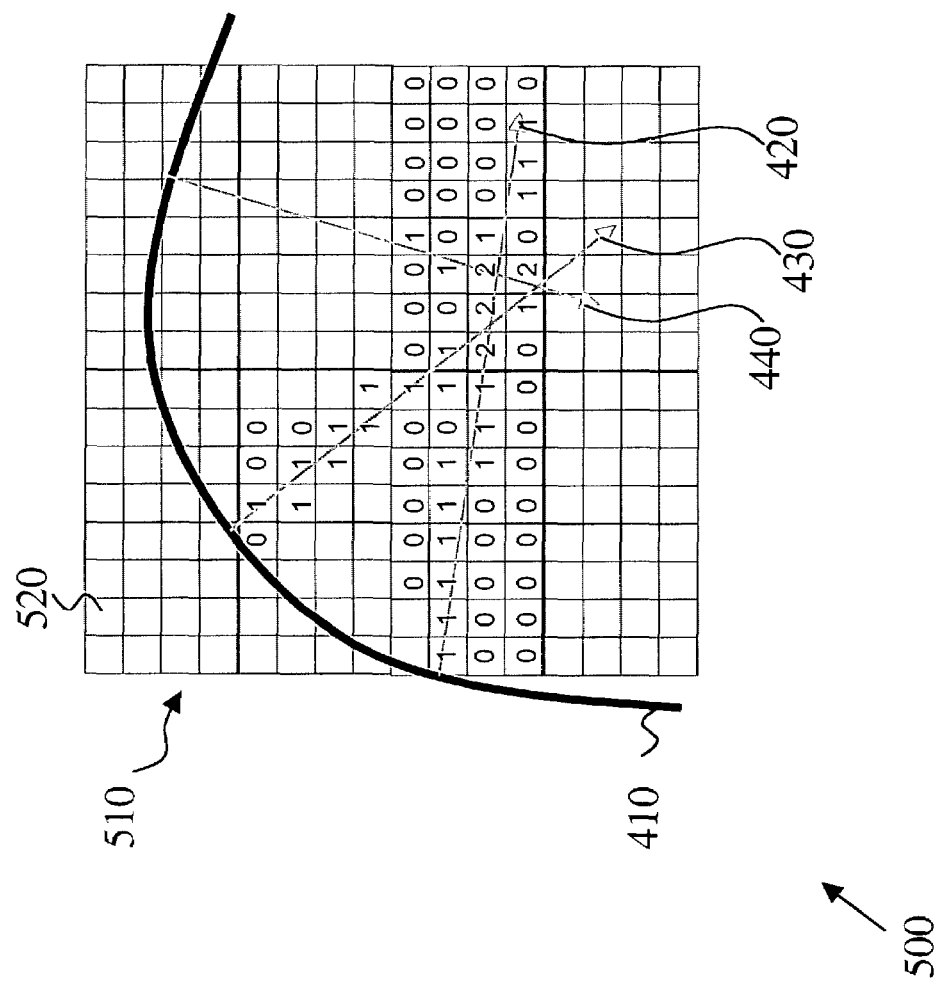

FIG. 5 shows the same image as shown by 400 in FIG. 4 with the difference that image voxels 510 are shown in image 500. Furthermore, FIG. 5 shows an example of how the present invention could keep track of the number of overlapping normal vectors. In this particular example, a 0 is used when a normal vector does not cross with an image voxel (520 is an example of an image voxel in 510) and a 1 is used when a normal vector does cross with an image voxel. In case two normal vectors intersect a value of 2 is assigned to that voxel. As a person of average skill in the art will readily appreciate, the number of intersections for a particular image voxel would increase the number of normal vectors assigned to that particular image voxel by increments of 1 according to this example. The tracking of intersections by integer numbers is just one example and the present invention is not limited to only integer numbers and could also be non-integer numbers. Any type of numbering system could be used and is not limited to a mathematical formulation, a coloring scheme, or the like, as long as one is able to track and discriminate the number of intersections of the normal vectors in a 2-D or 3-D space of an image. Furthermore, the present invention is not limited to tracking the number of intersections, since it could also track potential or near intersections of normal vectors, either separate or in combination with the intersections of normal vectors.

Figure 6:
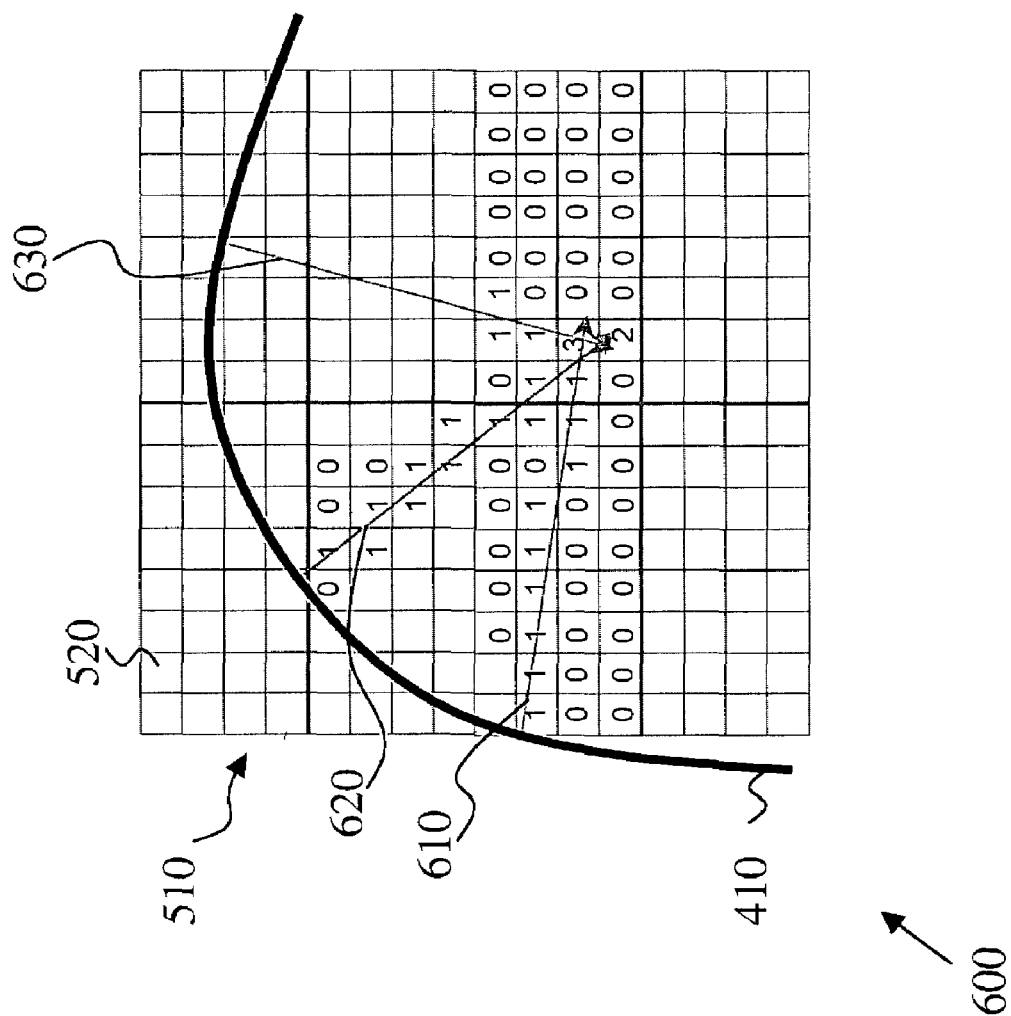

FIG. 6 shows a similar image as shown by 400 and 500 in FIGS. 4 and 5 with the difference that normal vectors 610, 620 and 630 are scaled according to a specific length which provides additional robustness (i.e. radial robustness) to the detection of shapes. Adjusting the length of the normal vectors could be achieved, for instance, but not limited to, scan-converting to a specific length the line segments or normal vectors that point in the direction of the gradient orientation. One of average skill would readily appreciate that the length of the scan-conversion is dependent on the type of detection.

Figure 7:
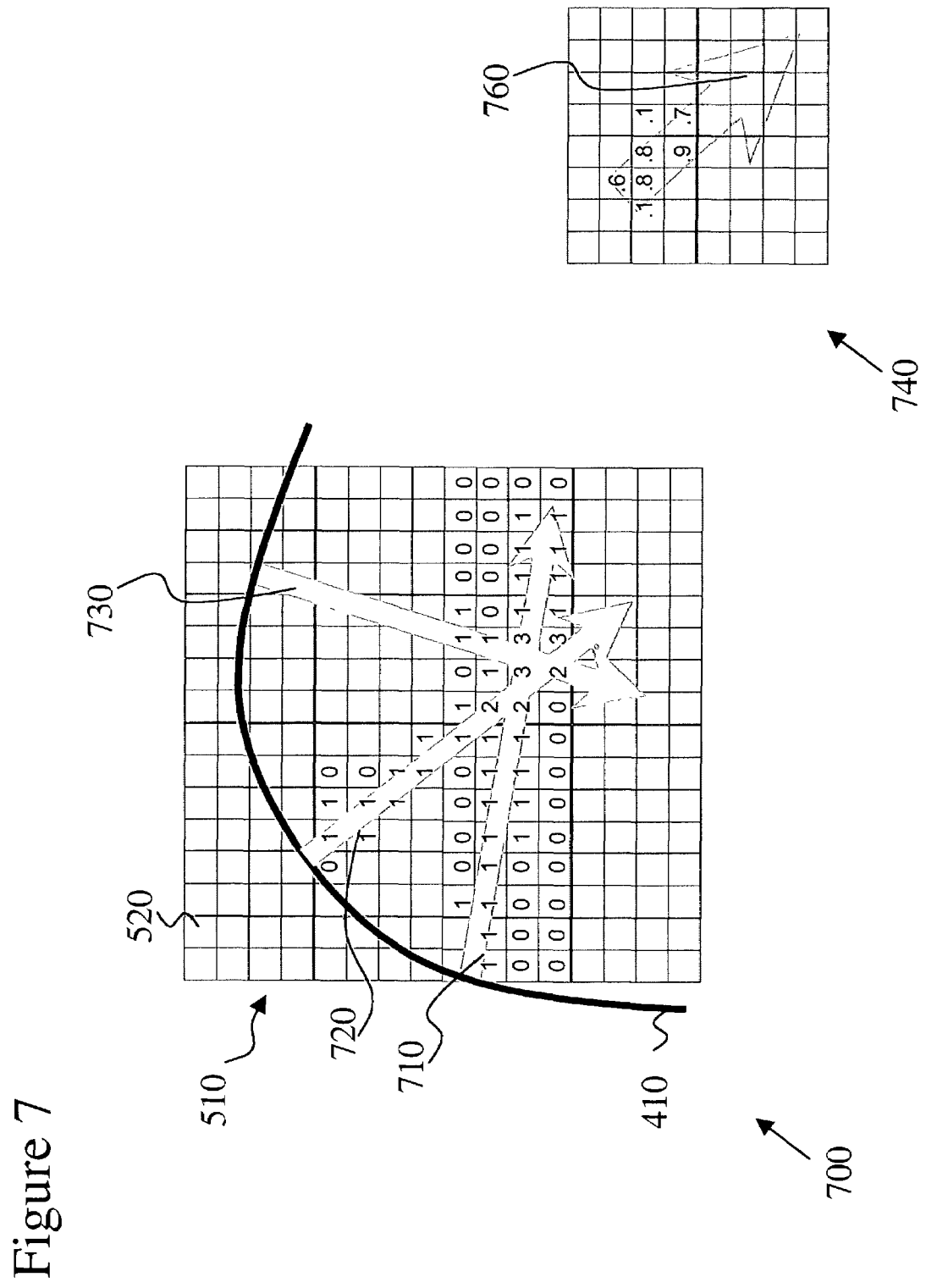

Furthermore, FIG. 7 shows a similar image as shown by 400 in FIG. 4 with the difference that normal vectors 710, 720 and 730 are now scaled according to a specific width which is specified in this example as a 2-D width, but could also be a 3-D width in a 3-D image. Such a scaling of the normal vectors provides additional robustness (i.e. transverse robustness) to the detection of shapes. Transverse robustness is added, for instance, but not limited to, by using thickened line segments with a Gaussian profile rather than e.g. one voxel thick line segments. This could, for instance, be achieved by convolving the normal vectors with a 3-D Gaussian, which could be implemented as a series of 1D convolutions for computational efficiency. For example, a discretized kernel could be chosen to include ±2σ to cover 95% of the Gaussian curve. However, the present invention is not limited to a Gaussian convolution and could include any variation or method to convolute the normal vectors. FIG. 7 also shows example 740 to show how non-integer numbers could be used to determine the degree to which a normal vector covers a voxel. A similar non-integer numbering could be applied for near intersections of normal vectors.

Figure 8:
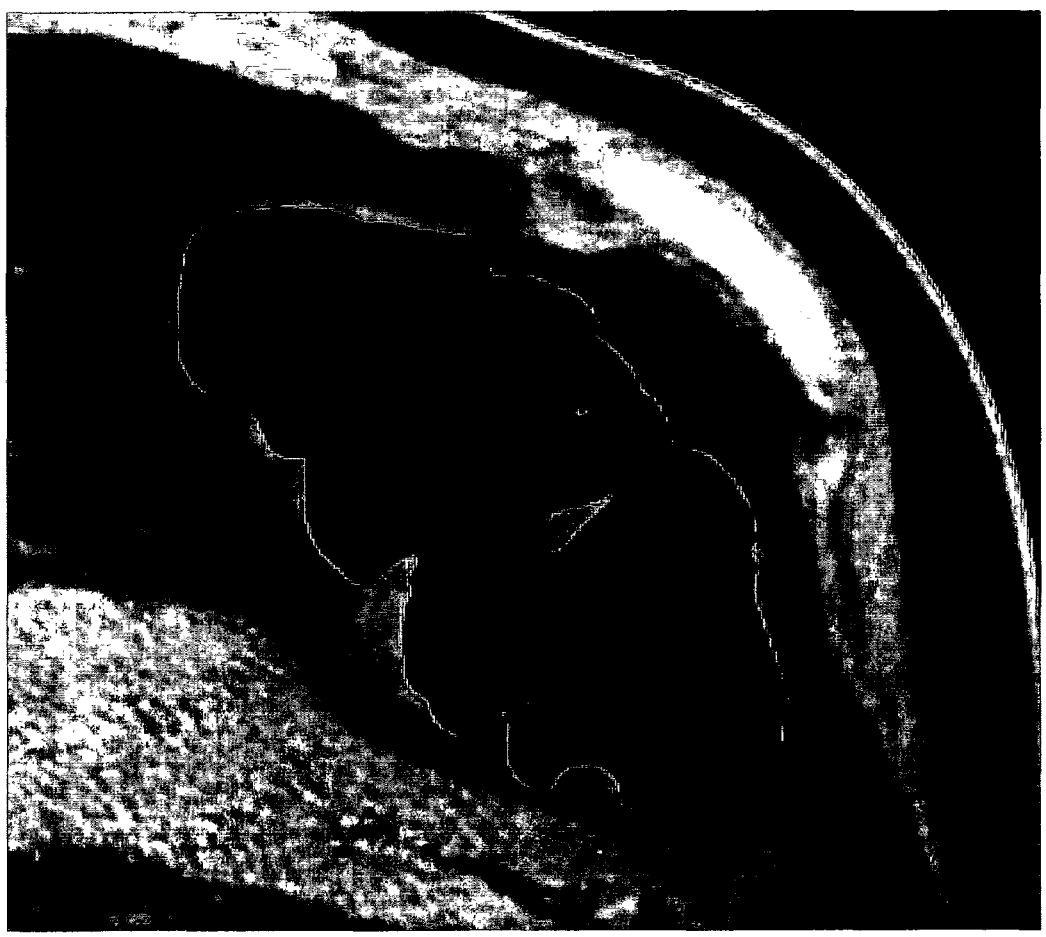
FIG. 8 shows an example of a colonic polyp in a medical image according to the present invention.
Figure 9:
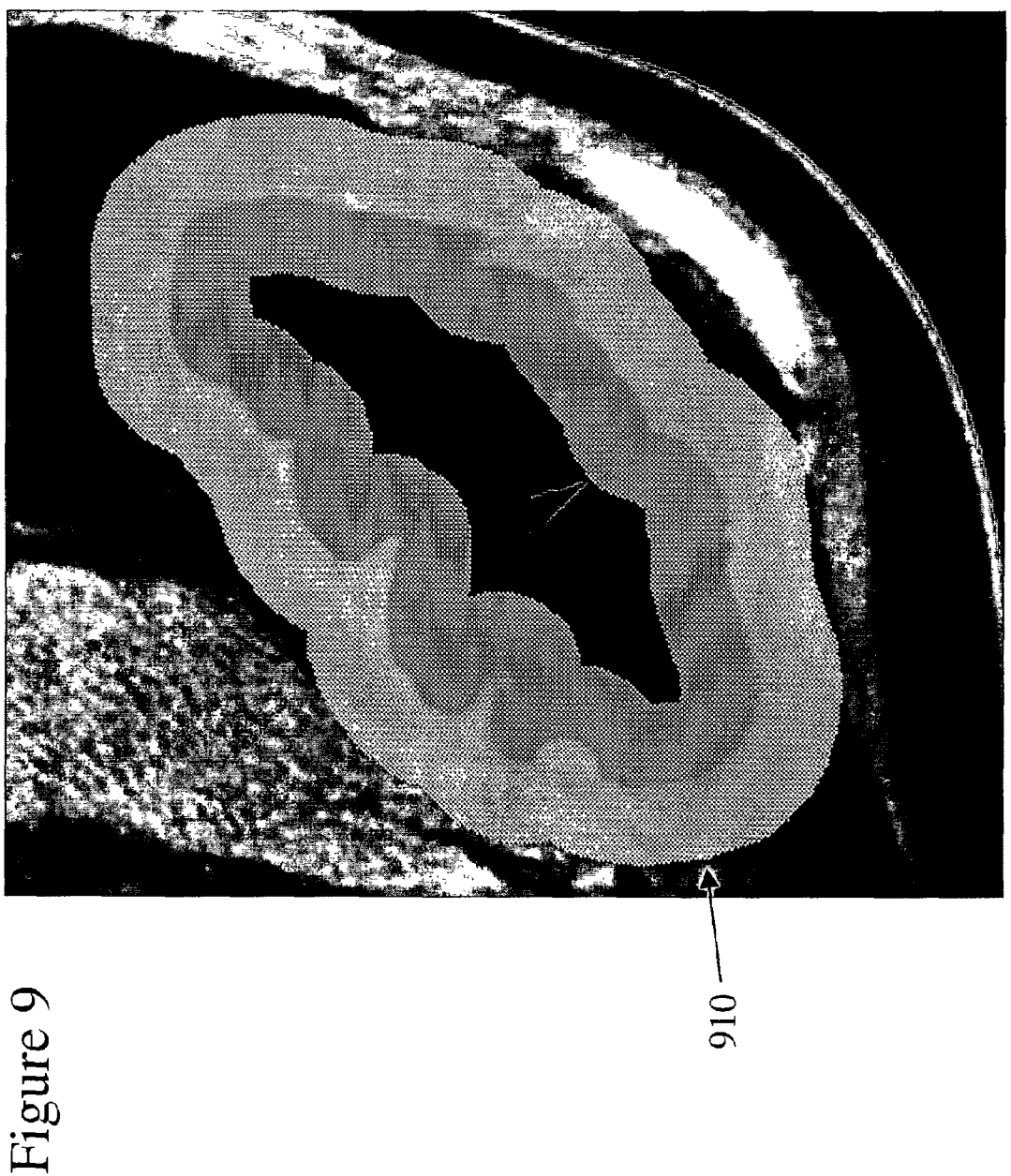
FIG. 9 shows an example of a pre-processed data showing a limited search space according a method that could be used in the present invention.
Figure 10:
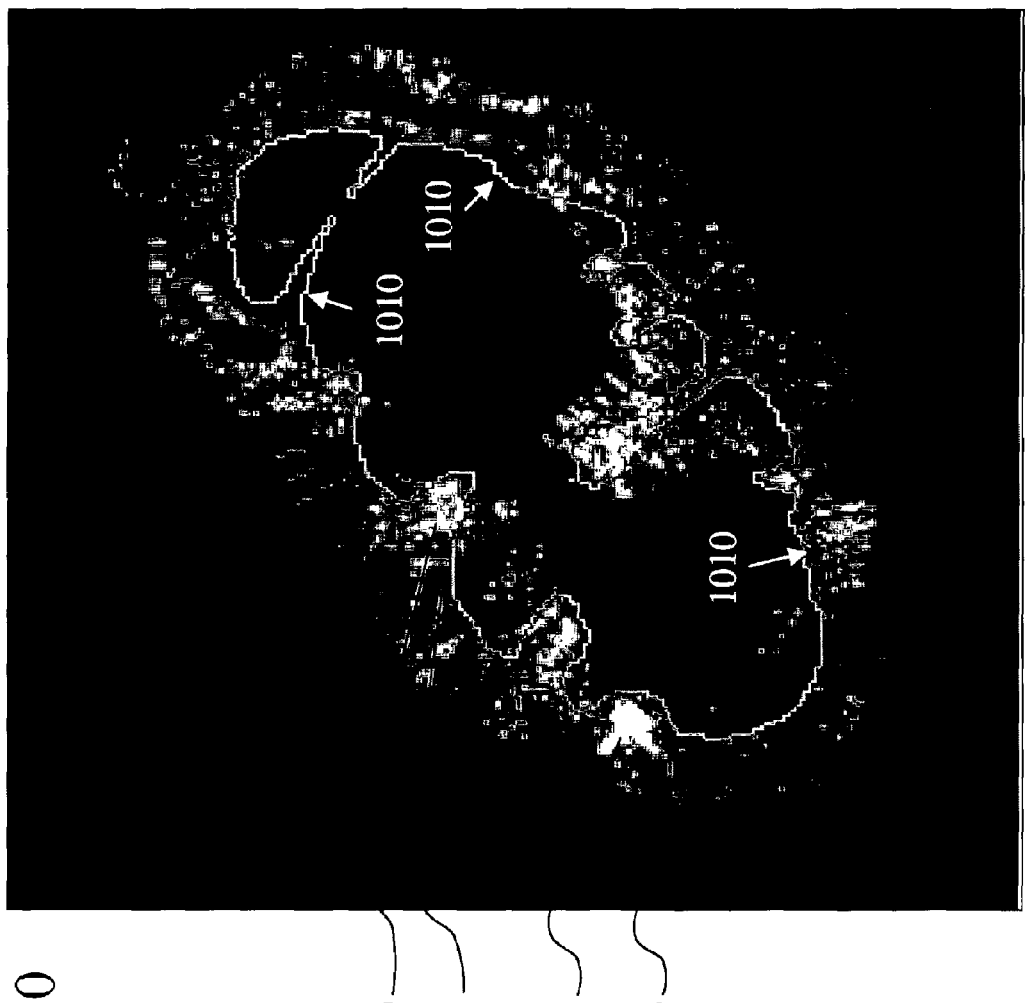
FIG. 10 shows an example of the result of an edge detection, which marks the surface of the polyp according to a method that could be used in the present invention.
Figure 11:
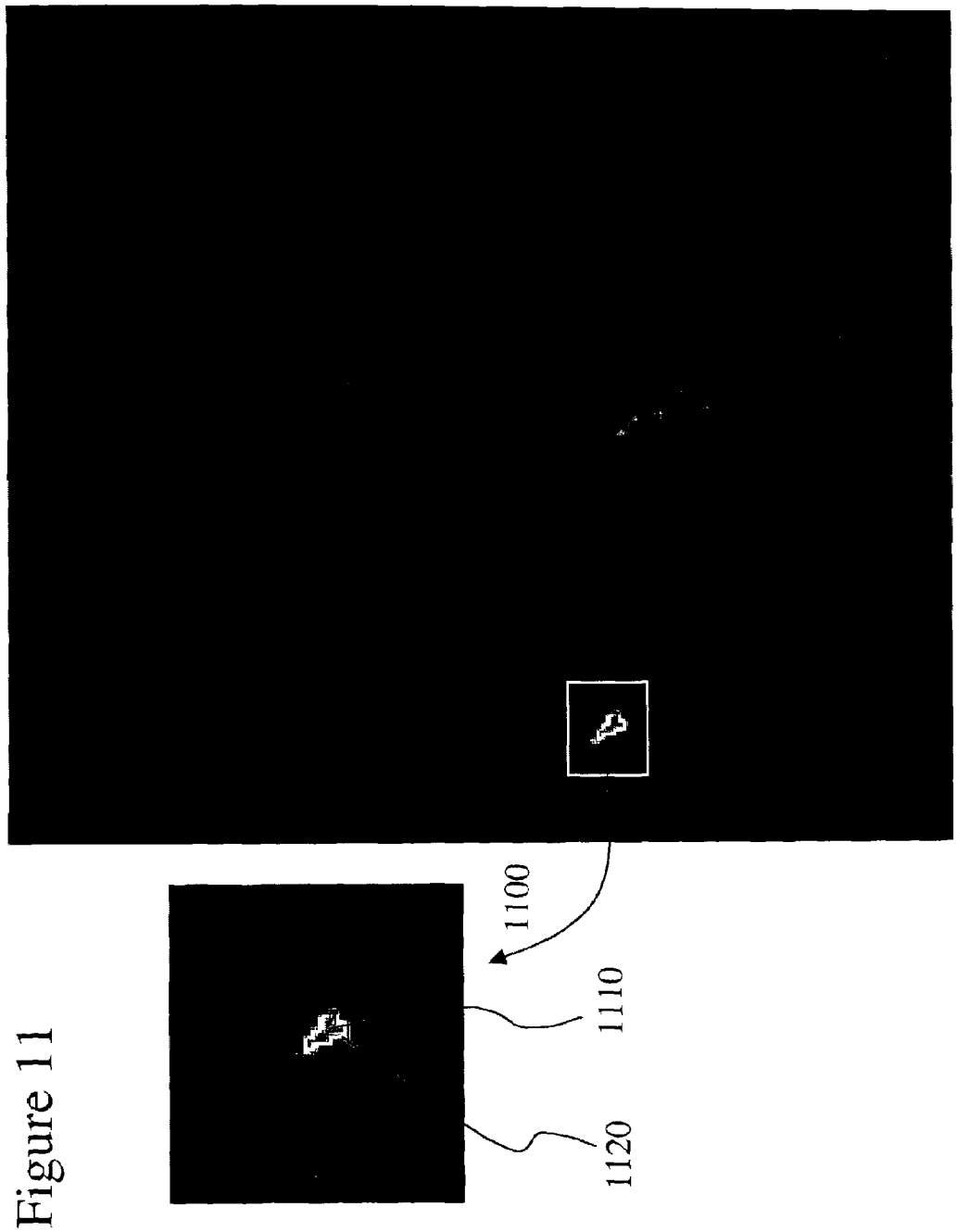
FIG. 11 shows the result of an example in which the counts of intersecting normal vectors were scaled in width using a low-pass filter to add, for instance, transverse robustness to the detection of shapes according to a method that could be used in the present invention.

FIG. 8 shows an example of a colonic polyp in a medical image according to the present invention. FIG. 9 shows an example of a pre-processed data showing a limited search space 910. FIG. 10 shows an example of the result of edge detection which marks the surface of the polyp. Arrows 1010 indicate only some points of the entire edge detection line which is visible in FIG. 10. FIG. 10 also shows the number of intersecting normal vectors 1020, 1030, 1040 and 1050 with different color intensities or gray scales. As it is apparent from FIG. 10, a radiologist is now able to focus in on a small percentage of an organ that most likely harbors clinically significant pre-malignant or malignant tissue. For instance, area 1030 indicates the highest probability of clinically significant pre-malignant or malignant tissue over areas 1020, 1040 and 1050 based on location and detection method 110. Among these four areas, area 1050 has the least probability of containing clinically significant pre-malignant or malignant tissue based on detection method 110. As mentioned above, method 110 is not limited to a coloring scheme or gray scale to indicate the degree of clinically significant pre-malignant or malignant tissue since it could also be a numerical scheme or the like. FIG. 11 shows the result of an example in which the counts of intersecting normal vectors were scaled in width using low-pass filtered to add, for instance, transverse robustness to the detection of shapes. Insert 1100 in FIG. 11 shows two areas 1110 and 1120 with different degrees of clinically significant pre-malignant or malignant tissue. In this particular example of FIG. 11, area 1110 has a higher probability than area 1120 of being clinically significant pre-malignant or malignant tissue. FIG. 11 shows that a radiologist could clearly focus in on a small percentage of an organ that most likely harbors clinically significant pre-malignant or malignant tissue. As one of average skill in the art would readily appreciate, method step 110 could use different techniques or filters to determine a threshold and detect tissue in the image that contains clinically significant pre-malignant or malignant tissue.

Figure 12:
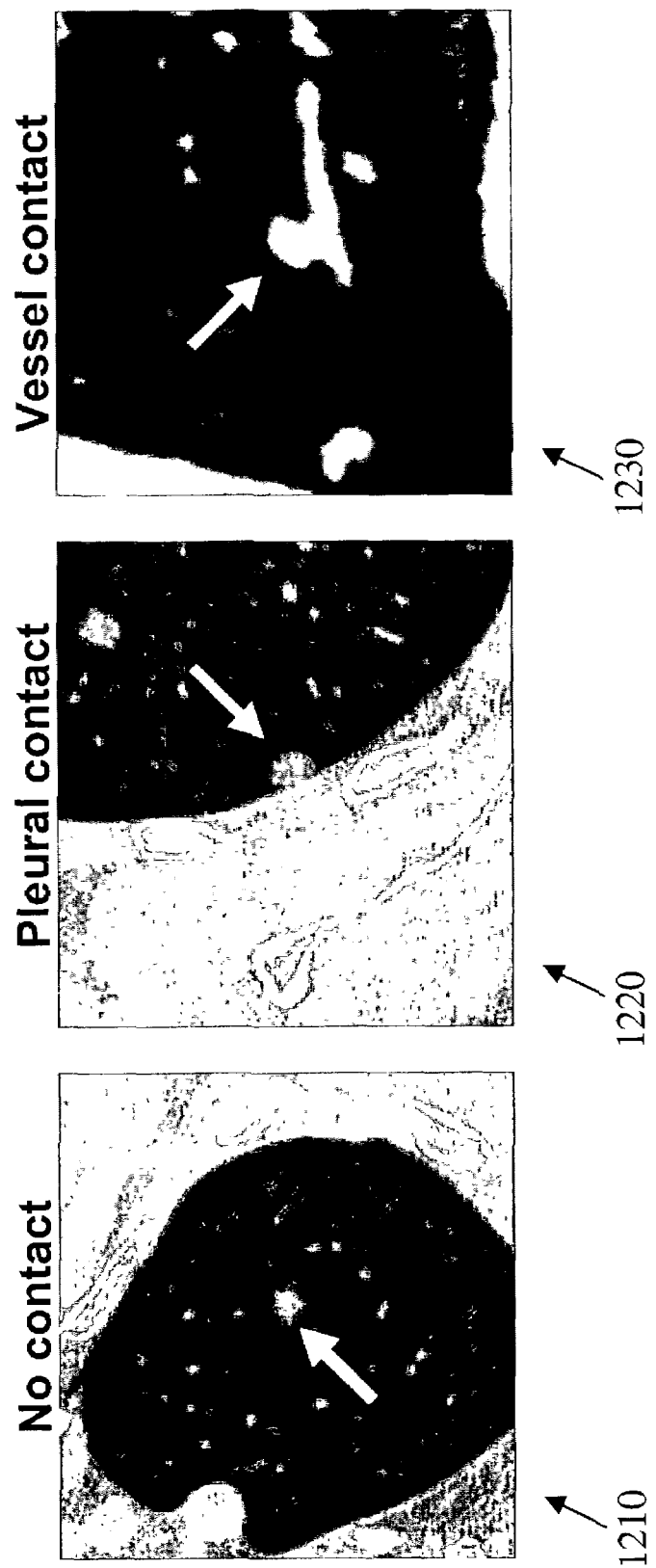
FIG. 12 shows medical images with some examples of candidate shapes in a lung according to the present invention.

Referring back to FIG. 1, once the step of localization and detection 110 of a shape has been accomplished, the shape can then be characterized 120. The essence of characterizing shape 120 is in using line of sight visibility 140 with respect to a candidate shape 130 as a measure of physical proximity to eliminate false positives that are due to structures or shapes in, for instance, the colon or lung with convex surfaces, such as haustral folds or pulmonary blood vessels. A detection due to false positive structures is usually based on the shape of the structure, which is often adjacent to normal or other distinct anatomical structures. For instance, a colonic polyp is always attached to the colon wall and some lung nodules are adjacent to either the chest wall or pulmonary vessels. FIG. 12 shows medical images with some examples of candidate shapes in a lung where the candidate shapes are indicated by arrows. The candidate shapes in FIG. 12 have either no contact to a vessel or pleura, have pleural contact or have vessel contact as respectively shown in 1210, 1220 and 1230.

Figure 13:
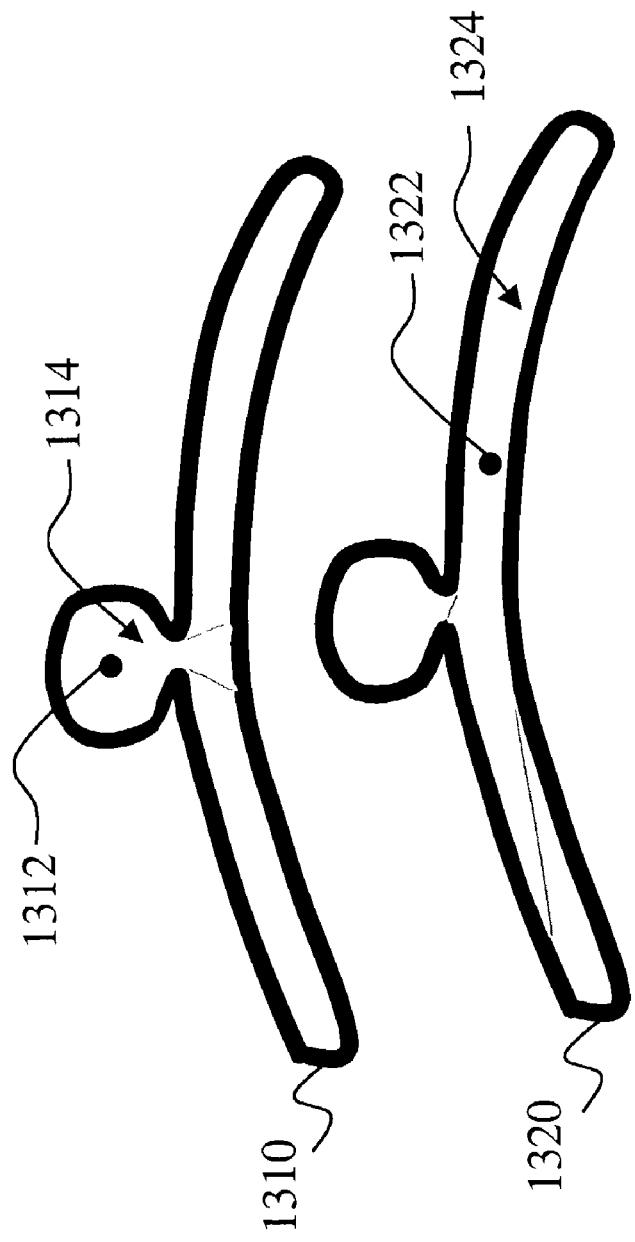
FIGS. 13–15 show exemplary embodiments of a characterization of a shape according to the present invention.

FIG. 13 shows exemplary embodiments of characterization 120 (see FIG. 1) of candidate shapes. A candidate shape is obtained and a location in the candidate shape is identified or selected. For instance, location 1312 is selected in an exemplary lung nodule, adjacent to pulmonary vessel 1310, whereas location 1322 is selected within an exemplary pulmonary vessel 1320. Referring to FIG. 1, at each candidate shape 130, a visible surface is computed 140 with respect to the location (e.g. 1312 and 1322 in FIG. 13) in the candidate shape (this is also referred to as a local segmentation or computing a local surface). From a location in a candidate shape, all of the visible surface voxels are identified or computed 140. Visibility or visible surface voxels could be defined to mean, for instance, but not limited to, that all voxels along a scan-converted line between two voxels is above a certain threshold. For instance, but not limited to, visibility or visible surface voxels could be defined to mean that all voxels along a scan-converted line between two voxels is above a −500 HU threshold with a 6-neighbor contiguous region of the structure's surface visible from the candidate shape. Among all of the contiguous pieces of visible surface, the one voxel closest to the candidate shape position is chosen. This set of voxels is then considered the closest contiguous visible surface. As one of average skill in the art would readily appreciate, the present invention is not limited to the level of intensity or the number of neighbors in order to define visibility.

Figure 14:
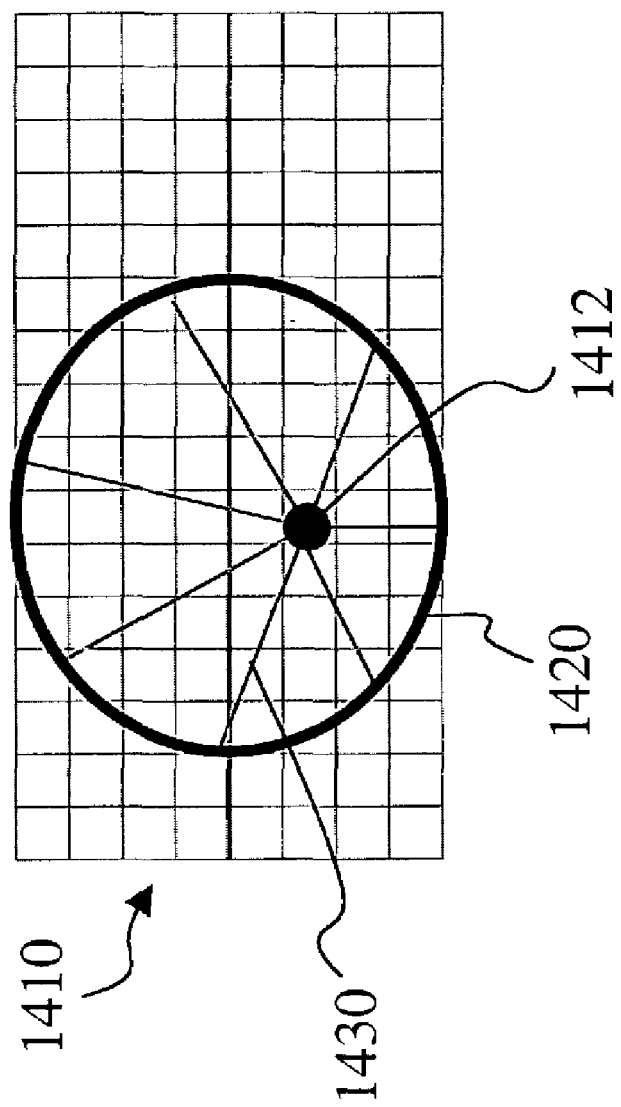
Figure 15:
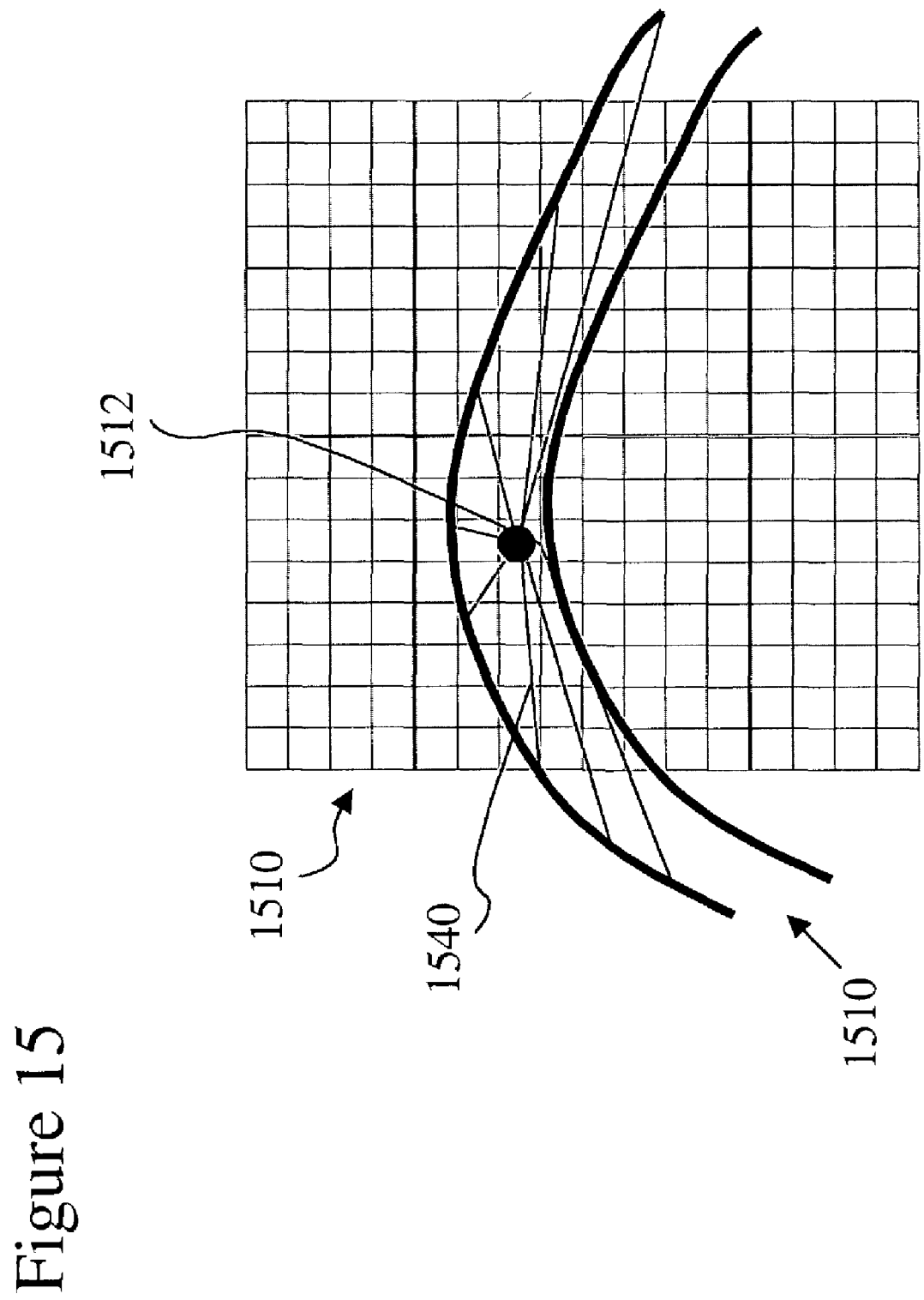

With respect to locations 1312 and 1322 in FIG. 13, visible surfaces 1314 and 1324 of candidate shapes (also indicated by the gray areas in FIG. 13) are computed, respectively. FIG. 14 shows an example of a location 1412 in a candidate shape located in a particular voxel in an anatomical structure 1420 with respect to voxels 1410. Lines, such as 1430, indicate the line of sight for location 1412 in anatomical structure 1420. FIG. 15 is another example of a location 1512 in a candidate shape located in a particular voxel in a anatomical structure 1520 with respect to voxels 1510. Lines, such as 1530, indicate the line of sight for location 1512 in anatomical structure 1520. FIGS. 14 and 15 shows a 2-D representation of a medical image, however, as mentioned above, the present invention includes 2-D and 3-D medical images and therefore the characterization of a candidate shape includes either a 2-D or 3-D line of sight visibility as a measure of physical proximity. Note that an analogy to the concept of line of sight is the area that is covered by a light shining in all directions and originating from a location in a candidate shape.

After the visible surface has been computed 140, one or more parameters of the visible surface could be computed 150. An example of computing 150 one or more parameters of the visible surface is by using, for instance, but not limited to, a principle components analysis (PCA) of the coordinates of the points on the visible surface. Other variations might include replacing the PCA with something similar such as a higher order independent components analysis. A PCA, also known as Karhunen-Loeve transform, could be performed on the spatial coordinates of each voxel in the closest contiguous visible surface which then yields parameters of the visible surface adjacent to the candidate shape. For instance, the PCA computes three eigenvalues (e1>e2>e3) that are representative of the major and minor axes of the ellipsoid that best fit the surface. The largest eigenvalue, e1, corresponds to the maximum dimension and the ratio of the smallest to the largest eigenvalues, e3/e1, corresponds to aspect ratio. For each candidate shape 130 one or more features 160 could be computed, derived or determined, such as, but not limited to, the number (or score) of intersections or nearly intersections of normal vectors based on detection 110, the size, and/or diameter (a transform converts the eigenvalues to diameter measurements: e.g. $d_1 \cong 3.45 \cdot \sqrt{e_1}$ where $i \in \{1,2,3\}$.), or the like.

Based on the one or more features of the candidate shape it would be possible to determine 170 whether or not, or to what extent, the candidate shape corresponds to a shape of interest; e.g. the degree of certainty whether or not the candidate shape fits the description of a shape of interest or fits a classification to which the candidate shape could be classified. Based on the one or more features, it could also be determined 170 whether or not the candidate shape should be considered as a shape of interest that contains pre-malignant or malignant tissue. As a person of average skill in the art would readily appreciate is that different features could be translated or linked to medical descriptors of diseases, medical diagnostics, or the like.

Parameters and/or features are useful to determine whether or not a candidate shape corresponds to a shape of interest. For instance, small values of e3/e1 tend to indicate rod-like or sheet-like structures, such as, pulmonary vessels or haustral folds. Additionally, large values of e1 tend to indicate non-lesions as well. For instance, candidate lung nodules, could rejected as being vessels if d1 is larger that 20 mm (too long to be a lung nodule), or if d3/d1 is less than 0.35 (too elongated to be a lung nodule). However, a candidate lung nodule, is not rejected if the line segment from the candidate lung nodule position to the voxel directly below it (inferior) on the edge of the dataset does not intersect lung tissue. Lung tissue could be segmented by region growing from within the lung parenchyma with a threshold of, for instance, but not limited to, −500 HU. This exception accepts lung nodules contacting the pleura on the bottom of the lung (near liver or mediastinum), which may have a very large closest contiguous visible surface due to the concavity of the lung near the liver or mediastinum.

Figure 16:
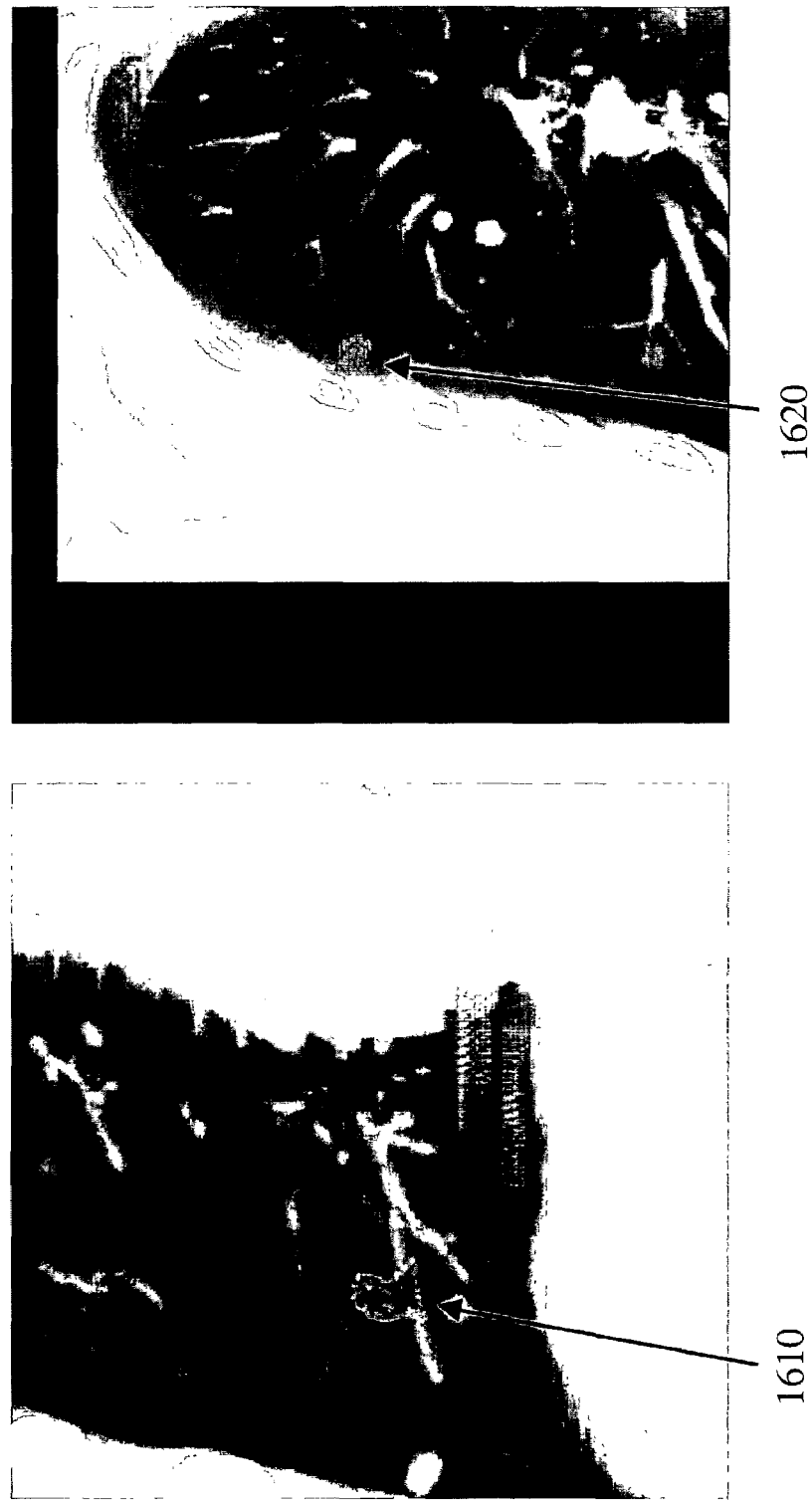
FIG. 16 shows an example of candidate shapes that were correctly accepted by the method of the present invention as being lung nodules.
Figure 17:
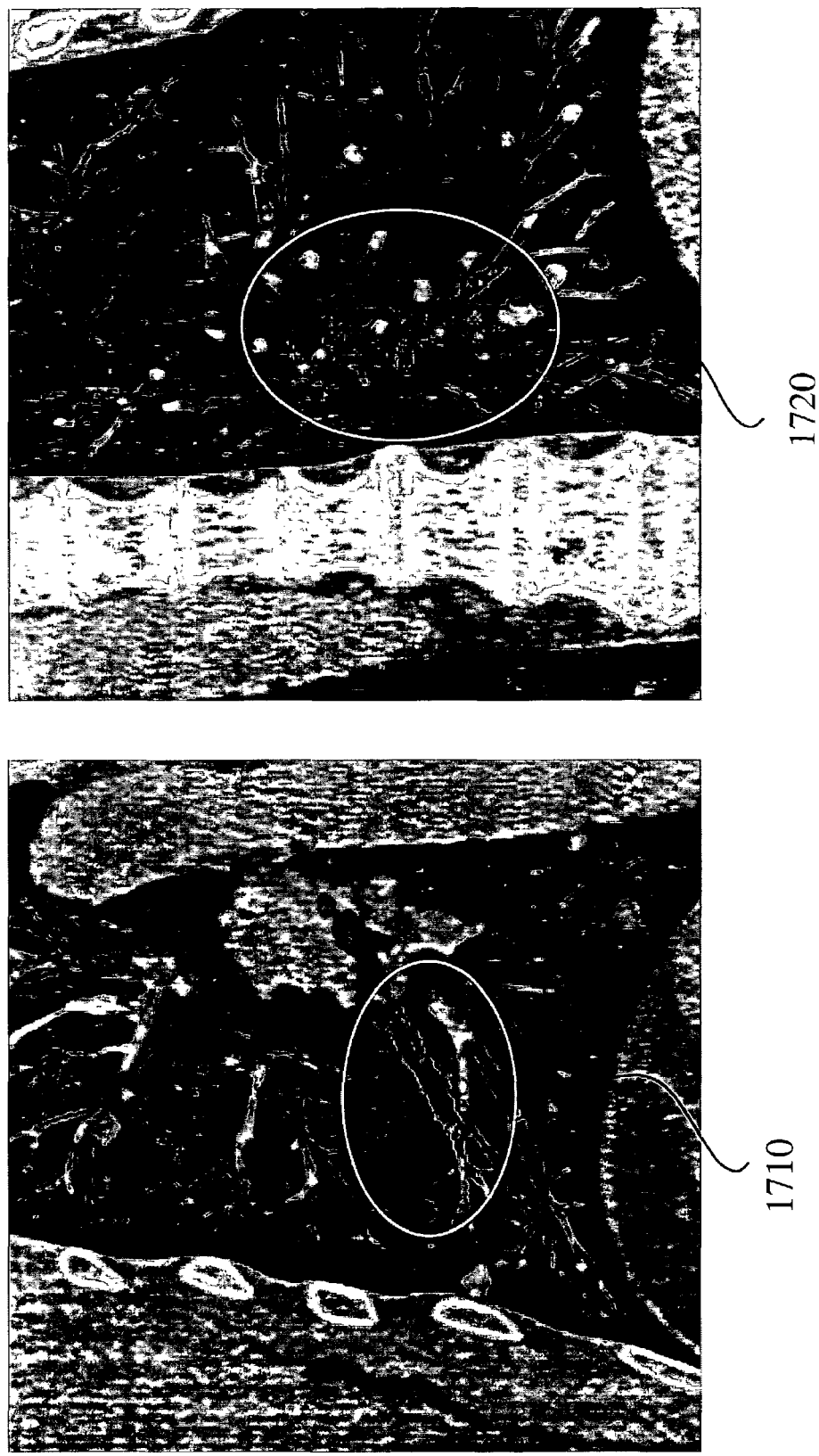
FIG. 17 shows examples of candidate shapes, shown within the ovals, which were correctly rejected by the method of the present invention as being vessels.
Figure 18:
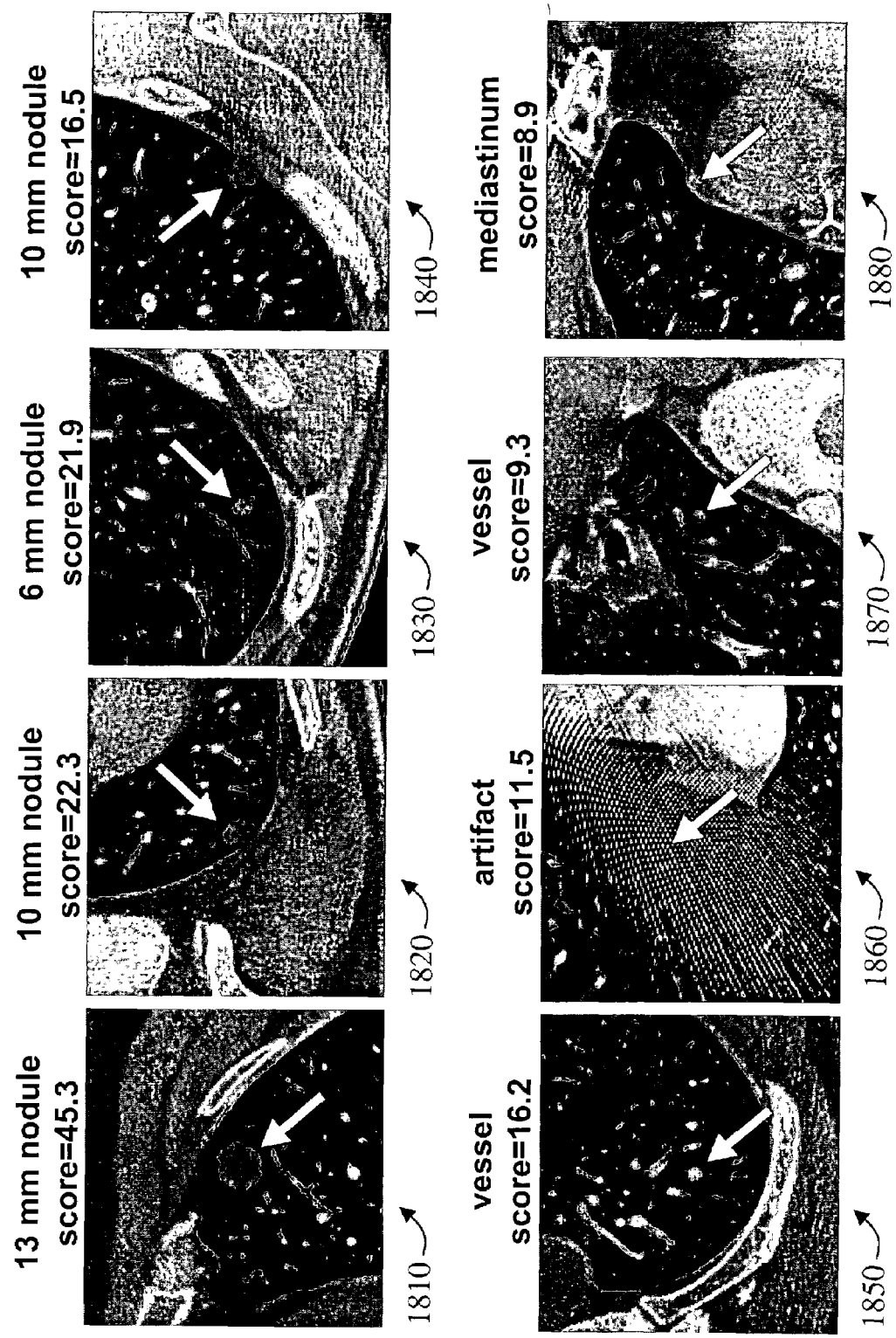
FIG. 18 shows different examples of candidate shapes that were characterized by the method of the present invention.

FIG. 16 shows an example of candidate shapes 1610 and 1620 that were correctly accepted by the method of the present invention as lung nodules. 1610 is an example of a lung nodule with vessel contact and 1620 is a lung nodule with pleural contact. FIG. 17 shows examples of candidate shapes, shown within ovals 1710 and 1720, which were correctly rejected by the method of the present invention as being vessels. FIG. 18 shows different examples of candidate shapes (each indicated by an arrow) with a score, the computed size of the shape and the determination whether or not the shape is considered to be a lung nodule. Candidate shapes indicated by arrows in 1810, 1820, 1830 and 1840 are considered to be lung nodules, whereas candidate shapes indicated in 1850, 1860, 1870 and 1880 by arrows are considered to be a vessel, artifact, vessel and mediastinum, respectively.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For instance, as one of average skill in the art would readily appreciate, the present invention could be implemented using a variety of different computer languages and operating systems and is not limited to a particular platform, language or system. All such variations are considered to be within the scope and spirit of the present invention as defined by the following claims and their legal equivalents.

What is claimed is:

1. A computer-implemented method for characterizing a shape in medical images, comprising:
    a) obtaining a candidate shape;
    b) selecting a location in said candidate shape;
    c) computing a visible surface adjacent to said candidate shape, wherein said visible surface comprises one or more portions of said medical image that are visible by said candidate shape, wherein said visible surface comprises all surface voxels that are visible along lines of sight from said location, and wherein said visible voxels are voxels that are above a threshold and that have a plurality of neighboring voxels above said threshold that are continuous along said line of sight; and
    d) computing one or more parameters of said visible surface.

2. The method as set forth in claim 1, further comprising, depending on values of said one or more parameters, determining whether said candidate shape corresponds to a shape of interest.

3. The method as set forth in claim 2, wherein said shape of interest comprises pre-malignant or malignant tissue.

4. The method as set forth in claim 2, wherein said candidate of interest is a nodule, a polyp or a lesion.

5. The method as set forth in claim 1, wherein said one or more parameters represent axes of an ellipsoid that fit said visible surface.

6. The method as set forth in claim 1, wherein step (d) comprises the step of performing a principle components analysis of said visible surface.

7. The method as set forth in claim 1, further comprising the step of computing one or more features of said candidate shape.

8. The method as set forth in claim 1, further comprising the step of classifying said candidate shape.

9. The method as set forth in claim 1, wherein said candidate shape is obtained manually by a user.

10. The method as set forth in claim 1, wherein said candidate shape is obtained by a computer-implemented location and detection method.

11. A computer-implemented method for characterizing a lung nodule in medical images, comprising:
    a) obtaining a candidate lung nodule;
    b) selecting a location in said candidate lung nodule;
    c) computing a visible surface adjacent to said candidate lung nodule, wherein said visible surface comprises one or more portions of said medical image that are visible by said candidate lung nodule, wherein said visible surface comprises all surface voxels that are visible along lines of sight from said location, and wherein said visible voxels are voxels that are above a threshold and that have a plurality of neighboring voxels above said threshold that are continuous along said line of sight;
    d) computing one or more parameters of said visible surface; and e) depending on values of said one or more parameters, determining whether said candidate lung nodule is a true lung nodule.

12. The method as set forth in claim 11, wherein said one or more parameters represent axes of an ellipsoid that fit said visible surface.

13. The method as set forth in claim 11, wherein step (d) comprises the step of performing a principle components analysis of said visible surface.

14. The method as set forth in claim 11, further comprising the step of computing one or more features of said candidate lung nodule.

15. The method as set forth in claim 11, further comprising the step of classifying said candidate lung nodule.

16. The method as set forth in claim 11, wherein said candidate lung nodule is obtained manually by a user.

17. The method as set forth in claim 11, wherein said candidate lung nodule is obtained by a computer-implemented location and detection method.

18. A computer-implemented method for characterizing a colonic polyp in medical images, comprising:
   a) obtaining a candidate colonic polyp;
   b) selecting a location in said candidate colonic polyp;
   c) computing a visible surface adjacent to said candidate colonic polyp, wherein said visible surface comprises one or more portions of said medical image that are visible by said candidate colonic polyp, wherein said visible surface comprises all surface voxels that are visible along lines of sight from said location, and wherein said visible voxels are voxels that are above a threshold and that have a plurality of neighboring voxels above said threshold that are continuous along said line of sight;
   d) computing one or more parameters of said visible surface; and
   e) depending on values of said one or more parameters, determining whether said candidate colonic polyp is a true colonic polyp.

19. The method as set forth in claim 18, wherein said one or more parameters represent axes of an ellipsoid that fit said visible surface.

20. The method as set forth in claim 18, wherein step (d) comprises the step of performing a principle components analysis of said visible surface.

21. The method as set forth in claim 18, further comprising the step of computing one or more features of said candidate colonic polyp.

22. The method as set forth in claim 18, further comprising the step of classifying said candidate colonic polyp.

23. The method as set forth in claim 18, wherein said candidate colonic polyp is obtained manually by a user.

24. The method as set forth in claim 18, wherein said candidate colonic polyp is obtained by a computer-implemented location and detection method.

\* \* \* \* \*

UNITED STATES PATENT AND TRADEMARK OFFICE
CERTIFICATE OF CORRECTION

| | | |
|---|---|---|
| PATENT NO. | : 7,043,064 B2 | Page 1 of 1 |
| APPLICATION NO. | : 10/138113 | |
| DATED | : May 9, 2006 | |
| INVENTOR(S) | : Paik | |

It is certified that error appears in the above-identified patent and that said Letters Patent is hereby corrected as shown below:

Col. 1, line 15, insert:

-- FEDERALLY-SPONSORED RESEARCH OR DEVELOPMENT

This invention was made with Government support under contract CA072023 awarded by the National Institutes of Health. The Government has certain rights in this invention. --

Signed and Sealed this
Ninth Day of August, 2011

David J. Kappos
*Director of the United States Patent and Trademark Office*